US010740689B2

(12) United States Patent
Kliuchnikov et al.

(10) Patent No.: US 10,740,689 B2
(45) Date of Patent: Aug. 11, 2020

(54) METHOD AND SYSTEM FOR QUANTUM CIRCUIT SYNTHESIS USING QUATERNION ALGEBRA

(71) Applicant: Microsoft Technology Licensing, LLC, Redmond, WA (US)

(72) Inventors: Vadym Kliuchnikov, Redmond, WA (US); Jon Yard, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 15/565,413

(22) PCT Filed: Apr. 5, 2016

(86) PCT No.: PCT/US2016/025958
§ 371 (c)(1),
(2) Date: Oct. 9, 2017

(87) PCT Pub. No.: WO2016/164325
PCT Pub. Date: Oct. 13, 2016

(65) Prior Publication Data
US 2018/0129966 A1 May 10, 2018

Related U.S. Application Data

(60) Provisional application No. 62/146,182, filed on Apr. 10, 2015.

(51) Int. Cl.
*G06N 10/00* (2019.01)
*G06F 17/16* (2006.01)
(52) U.S. Cl.
CPC ............ *G06N 10/00* (2019.01); *G06F 17/16* (2013.01)

(58) Field of Classification Search
CPC ......... G06N 10/00; G06F 17/16; G06F 30/30; G06F 30/327
(Continued)

(56) References Cited

U.S. PATENT DOCUMENTS

| 6,472,681 B1 | 10/2002 | Kane |
| 7,028,275 B1 | 4/2006 | Chen et al. |

(Continued)

FOREIGN PATENT DOCUMENTS

| CN | 1773450 A | 5/2006 |
| WO | WO 2014/015200 | 1/2014 |

(Continued)

OTHER PUBLICATIONS

Arroyo-Camejo et al., "Room Temperature High-Fidelity Holonomic Single-Qubit Gate on a Solid-State Spin," *Nature Communications,* 5 pages (Sep. 12, 2014).

(Continued)

*Primary Examiner* — Paul Dinh
(74) *Attorney, Agent, or Firm* — Klarquist Sparkman, LLP (57) ABSTRACT

Quantum circuits are synthesized based on a projective gate set derived from a set of single-qubit gates, typically a basis set such as the Clifford+T gates or the V-gates. An initial projective gate set is used to determine at least one characteristic of a quaternion algebra, and the quaternion algebra is used to define a new projective gate set. Exactly synthesizable unitaries are identified, and a circuit approximating a target unitary is defined in the single-qubit gate set by mapping from the new projective gate set.

19 Claims, 7 Drawing Sheets

(58) Field of Classification Search
USPC .......................................................... 716/104
See application file for complete search history.

(56) References Cited

U.S. PATENT DOCUMENTS

| | | | |
|---|---|---|---|
| 7,364,923 | B2 | 4/2008 | Lidar et al. |
| 7,398,507 | B2 | 7/2008 | Chang et al. |
| 8,190,553 | B2 | 5/2012 | Routt |
| 8,527,437 | B1 | 9/2013 | Tucci |
| 8,671,369 | B2 | 3/2014 | Ahn |
| 8,744,075 | B2 | 6/2014 | Tanaka |
| 2006/0123363 | A1* | 6/2006 | Williams ............... G06N 10/00 716/101 |
| 2006/0175606 | A1* | 8/2006 | Wang ..................... G01D 21/00 257/48 |
| 2007/0162262 | A1 | 7/2007 | Tucci |
| 2009/0164435 | A1 | 6/2009 | Routt |
| 2010/0091890 | A1* | 4/2010 | Al-Dhahir ............. H04L 1/0618 375/259 |
| 2012/0157008 | A1* | 6/2012 | Prihed ................... G06F 7/4812 455/69 |
| 2013/0046806 | A1* | 2/2013 | Hashimoto ........... G06F 17/142 708/404 |
| 2014/0264288 | A1 | 9/2014 | Svore et al. |
| 2014/0280427 | A1* | 9/2014 | Bocharov .............. G06N 10/00 708/523 |
| 2015/0106418 | A1 | 4/2015 | Kliuchnikov et al. |
| 2016/0284347 | A1* | 9/2016 | Sainath ................ G06N 3/0445 |

FOREIGN PATENT DOCUMENTS

| | | |
|---|---|---|
| WO | WO 2014/015203 | 1/2014 |
| WO | WO 2014/151571 | 9/2014 |
| WO | WO 2015/057742 | 4/2015 |

OTHER PUBLICATIONS

Bocharov et al., "Efficient Decomposition of Single-Qubit Gates into V Basis Circuits," available at: http://arxiv.org/pdf/1303.1411v1, 13 pages (Mar. 6, 2013).

Bocharov et al., "Efficient Synthesis of Probabilistic Quantum Circuits with Fallback," available at: http://arxiv.org/pdf/1409.3552v2, 17 pages (Sep. 19, 2014).

Cafaro et al., "A Geometric Algebra Perspective on Quantum Computational Gates and Universality in Quantum Computing," available at: http://arxiv.org/pdf/1006.2071v1, 18 pages (Jun. 10, 2010).

Forest et al., "Exact Synthesis of Single-Qubit Unitaries over Clifford-Cyclotomic Gate Sets," available at: http://arxiv.org/pdf/1501.04944v1, 29 pages (Jan. 20, 2015).

Giles et al., "Exact synthesis of Multiqubit Clifford+T circuits," available at: http://arxiv.org/pdf/1212.0506v3, 7 pages (Apr. 2, 2013).

Giles et al., "Remarks on Matsumoto and Amano's normal form for single-qubit Clifford+T operators," available at: http://arxiv.org/pdf/1312.6584v1, 13 pages (Dec. 23, 2013).

Gosset et al., "An Algorithm for the T-Count," available at: http://arxiv.org/pdf/1308.4134v1, 12 pages (Aug. 19, 2013).

International Preliminary Report on Patentability from International Application No. PCT/US2016/025958, dated Jul. 17, 2017, 18 pages.

International Search Report and Written Opinion from International Application No. PCT/US2016/025958, dated Jul. 11, 2016, 13 pages.

Khosropour et al., "Quantum Division Circuit Based on Restoring Division Algorithm," *2011 Eighth International Conference on Information Technology: New Generations*, pp. 1037-1040 (Apr. 11, 2011).

Kliuchnikov, "New methods for quantum compiling," Thesis for PhD in Computer Science at University of Waterloo, http://hdl.handle.net/10012/8394, 133 pages (Apr. 30, 2014).

Kliuchnikov, "Synthesis of unitaries with Clifford+T circuits," available at: http://arxiv.org/pdf/1306.3200v1, 4 pages (Jun. 13, 2013).

Kliuchnikov et al., "Asymptotically Optimal Topological Quantum Compiling," available at: http://arxiv.org/pdf/1310.4150v1, 24 pages (Oct. 15, 2013).

Kliuchnikov et al., "Fast and Efficient Exact Synthesis of Single Qubit Unitaries Generated by Clifford and T Gates," available at: http://arxiv.org/pdf/1206.5236v4, 23 pages (Feb. 27, 2013).

Li et al., "A Quantum CAD Accelerator Based on Grover's Algorithm for Finding the Minimum Fixed Polarity Reed-Muller Form," Proceedings of the 36th International Symposium on Multiple-Valued Logic, 6 pages (May 17, 2006).

Matzke, "Quantum Computation Using Geometric Algebra," Dissertation, The University of Texas at Dallas, 206 pages (May 2002).

Natapov, "Projective bases of division algebras and groups of central type II," available at: http://arxiv.org/pdf/0710.5468v1, 12 pages (Oct. 29, 2007).

Ruican et al., "Genetic Algorithm Based Quantum Circuit Synthesis With Adaptive Parameters Control," 2009 *IEEE Congress on Evolutionary Computation*, pp. 896903 (May 18, 2009).

U.S. Appl. No. 61/977,570, Bocharov et al., "Efficient Synthesis of Repeat-Until-Success Circuits in Clifford and T Basis," filed Apr. 9, 2014, 30 pages.

U.S. Appl. No. 62/009,066, Wiebe et al., "Quantum Algorithms for Arithmetic and Function Synthesis," filed Jun. 6, 2014, 22 pages.

U.S. Appl. No. 62/049,238, Bocharov et al., "Efficient Synthesis of Probabilistic Quantum Circuits with Fallback," filed Sep. 11, 2014, 40 pages.

Written Opinion of the International Preliminary Examining Authority from International Application No. PCT/US2016/025958, dated Jan. 2, 2017, 7 pages.

"Algebraic number field," Wikipedia, retrieved from https://en.wikipedia.org/wiki/Algebraic_number_field, retrieved on Dec. 13, 2019, 13 pages.

"Associative algebra," Wikipedia, retrieved from https://en.wikipedia.org/wiki/Associative_algebra, retrieved on Dec. 13, 2019, 7 pages.

"Encyclopedia of Mathematics," Main Page, retrieved from https://www.encyclopediaofmath.org/index.php/Main_Page, retrieved on Dec. 13, 2019, 2 pages.

"Field extension," Wikipedia, retrieved from https://en.wikipedia.org/wiki/Field_extension, retrieved on Dec. 13, 2019, 6 pages.

"Magma Computer Algebra," retrieved from http://magma.maths.usyd.edu.au/magma/handbook/text/1531, retrieved on Dec. 13, 2019, 16 pages.

"Module (mathematics)," Wikipedia, retrieved from https://en.wikipedia.org/wiki/Module_(mathematics), retrieved on Dec. 13, 2019, 7 pages.

"Ring (mathematics)," Wikipedia, retrieved from https://en.wikipedia.org/wiki/Ring_(mathematics), retrieved on Dec. 13, 2019, 28 pages.

"Semisimple algebra," Wikipedia, retrieved from https://en.wikipedia.org/wiki/Semisimple_algebra, retrieved on Dec. 13, 2019, 3 pages.

"Simple algebra," Wikipedia, retrieved from https://en.wikipedia.org/wiki/Simple_algebra, retrieved on Dec. 13, 2019, 2 pages.

Washington, "Introduction to Cyclotomic Fields," Book cover, Graduate Texts in Mathematics, 2 pages (1997).

Voight, "Computing fundamental domains for Fuchsian groups," Journal De Theorie des Nombres de Bordeaux, vol. 21, No. 2, 23 pages (Jan. 16, 2009).

Shor, "Polynomial-Time Algorithms for Prime Factorization and Discrete Logarithms on a Quantum Computer," SIAM Review, 41:303-332 (1999).

Shimura, "On Dirichlet Series and Abelian Varieties Attached to Automorphic Form," Annals of Mathematics, Second Series, 76:237-294 (Sep. 1962).

Alaca et al., "Introductory Algebraic Number Theory," published by Cambridge University Press, 20 pages (2004).

Anderson et al., "Classification of transversal gates in qubit stabilizer codes," available at: http://arxiv.org/pdf/1409.8320v1, 23 pages (Sep. 29, 2014).

Zhang et al., "Optimal quantum circuit synthesis from Controlled-U gates," available at: http://arxiv.org/pdf/quant-ph/0308167v1, 6 pages (Aug. 29, 2003).

(56) References Cited

OTHER PUBLICATIONS

Bourgain et al., "On the spectral gap for finitely-generated subgroups of SU(2)," Invent. Math., 171:83-121, (Sep. 9, 2007).
Bourgain et al., "Spectral gaps in SU(d)," C. R. Acad. Sci. Paris, 348:609-611 (May 4, 2010).
Bugeaud, "Approximation by Algebraic Numbers," Book cover, published by Cambridge University Press, 1 page (Nov. 8, 2004).
Shastri, "Integral Points on the Unit Circle," Journal of Number Theory, 91:67-70 (Nov. 2001).
Serre, "Le groupe quaquaversal, vu comme groupe S-arithmetique," Olberwolfach Report, 6:1421-1422 (2009).
Cerri et al., "Euclidean Totally Definite Quaternion Fields Over the Rational Field and Over Quadratic Number Fields," International Journal of Number Theory, 9:653-673 (May 13, 2013).
Cohen, "A Course in Computational Algebraic Number Theory," Springer Science & Business Media, 563 pages (1993).
Cohen, "Advanced Topics in Computational Number Theory," Book cover, published by Springer-Verlag New York, 2 pages (2000).
"PARI/GP home," retrieved from http://pari.math.u-bordeaux.fr/, retrieved on Dec. 16, 2019, 1 page.
Conway et al., "Relations in SO(3) Supported by Geodetic Angles," Discrete Comput Geom, 23:453-463 (2000).
Coulangeon et al., "Computing in arithmetic groups with Voronoi's algorithm," available at: http://arxiv.org/pdf/1407.6234v1, 22 pages (Jul. 23, 2014).
Dawson et al., "The Solovay-Kitaev Algorithm," Journal of Quantum Information and Computation, available at: http://arxiv.org/quant-ph/0505030v2, 15 pages (Aug. 23, 2005).
Duclos-Cianci et al., "Reducing the quantum computing overhead with complex gate distillation," available at: http://arxiv.org/pdf/1403.5280v1, 9 pages (Mar. 20, 2014).
Selinger, "Efficient Clifford+T approximation of single-qubit operators," available at: https://arxiv.org/pdf/1212.6253v2, 17 pages (Jul. 29, 2014).
Russell, "The Exact Synthesis of 1-and 2-Qubit Clifford+T Circuits," Honours Thesis, available at: http://arxiv.org/pdf/1408.6202v1, 21 pages (May 2, 2014).
Ross et al., "Optimal ancilla-free Clifford+T approximation of z-rotations," available at: http://arxiv.org/pdf/1403.2975v3, 40 pages (Jun. 15, 2016).
Gottesman et al., "Demonstrating the viability of universal quantum computation using teleportation and single-qubit operations," Nature, 402:390-393 (Nov. 25, 1999).
Hardy et al., "An Introduction to the Theory of Numbers", Book cover, published by Oxford University Press, 6th Edition, 2 pages (2008).
Harrow et al., "Efficient Discrete Approximations of Quantum Gates,"available at: http://arxiv.org/quant-ph/0111031v3, 7 pages (Jul. 11, 2002).
Hull, "On the Units of Indefinite Quaternion Algebras," American Journal of Mathematics, 61:365-374 (Apr. 1939).
Reiner, "Maximal orders," Book cover, published by Academic Press, 1 page (1975).
Kirschmer et al., "Algorithmic Enumeration of Ideal Classes for Quaternion Orders," available at: http://arxiv.org/pdf/0808.3833v4, 39 pages (Nov. 18, 2014).
Kleinert, "Units in Skew Fields," Book cover, published by Birkhauser, 2 pages (2000).
Kliuchnikov et al., "Asymptotically optimal approximation of single qubit unitaries by Clifford and T circuits using constant number of ancillary qubits," http://arxiv.org/pdf/1212.0822v2, 5 pages (Dec. 6, 2012).
Radin et al., "Subgroups of SO(3) Associated with Tilings," Journal of Algebra, 202:611-633 (1998).
Radin et al., "On 2-Generator Subgroups of SO(3)," Transactions of the American Mathematical Society, 351:4469-4480 (Jun. 10, 1999).
Paetznick et al., "Repeat-Until-Success: Non-deterministic cecomposition of single-qubit unitaries," available at: http://arxiv.org/pdf/1311.1074v2, 26 pages (Oct. 19, 2014).
Nguyen et al., "The LLL Algorithm," Book cover, published by Springer Berlin Heidelberg, 8 pages (2010).
Kliuchnikov et al., "Practical approximation of single-qubit unitaries by single-qubit quantum Clifford and T circuits," available at: http://arxiv.org/pdf/1212.6964v2, 11 pages (Mar. 13, 2014).
Neukirch, "Algebraic Number Theory," published by Springer Berlin Heidelberg, 581 pages (1999).
Knus et al., "The Book of Involutions," American Mathematical Society, vol. 44, 588 pages (1998).
Kohel, "Hecke Module Structure of Quaternions," Advanced Studies in Pure Mathematics, 30:177-195 (2001).
Landahl et al., "Complex instruction set computing architecture for performing accurate quantum Z rotations with less magic," available at: https://arxiv.org/pdf/1302.3240v2, 13 pages (Oct. 13, 2013).
Lemmermeyer, "Conics—A Poor Man's Elliptic Curves," available at: https://arxiv.org/pdf/math/0311306v1, 11 pages (Nov. 18, 2003).
Lubotzky et al., "Hecke Operators and Distributing Points on S2. II," Communications on Pure and Applied Mathematics, XL:401-420 (Jul. 1987).
Lye et al., "Determining the Minimal Number of SWAP Gates for Multi-Dimensional Nearest Neighbor Quantum Circuits," Proceedings of the 20th Asia and South Pacific Design Automation Conference, 6 pages (Jan. 19, 2015).
Paler et al., "Synthesis of Topological Quantum Circuits," available at: http://arxiv.org/pdf/1302.5182v1, 7 pages (Feb. 21, 2013).
Perkowski et al., "Synthesis of Quantum Circuits in Linear Nearest Neighbor Model Using Positive Davio Lattices," Facta Universitatis-Series: Elect. Energ., 24:71-87 (Apr. 2011).

* cited by examiner

METHOD AND SYSTEM FOR QUANTUM CIRCUIT SYNTHESIS USING QUATERNION ALGEBRA

CROSS REFERENCE TO RELATED APPLICATIONS

This is the U.S. National Stage of International Application No. PCT/US2016/025958, filed Apr. 5, 2016, which was published in English under PCT Article 21(2), which in turn claims the benefit of U.S. Provisional Application No. 62/146,182, filed Apr. 10, 2015. The provisional application is incorporated herein in its entirety.

FIELD

The disclosure pertains to quantum circuit synthesis.

BACKGROUND

Quantum circuit synthesis typically involves complex number-theoretic computations. A set of quantum gates is selected to serve as a basis, and various basis-specific approaches are used to synthesize a target unitary in the selected basis. Some methods for bases such as the Clifford+T basis, the V-basis, and the Fibonacci anyon basis are available, but these methods are limited to a single basis. In addition, for some bases, it is unclear how to synthesize a target unitary, or if such a synthesis is possible. Synthesized circuits are often based on approximate unitaries that correspond to the target unitary within a specified precision, so that the target unitary is synthesized based on exactly synthesizable unitaries. Unfortunately, conventional synthesis methods are limited in the available selection of bases, and synthesis methods applicable to arbitrary bases are needed.

SUMMARY

Quantum circuit synthesis methods based on a predetermined single-qubit gate set include determining an initial projective gate set (PGS) associated with the single-qubit gate set. A set of elements of a quaternion algebra related to the PGS is determined, and in some cases, the associated quaternion algebra and elements of the quaternion algebra are established. Based on a maximal order and a set of ideals associated with the quaternion algebra, a final projective gate set (PGS*) is determined. A target unitary is mapped to a set of unitaries that are exactly representable based on PGS*, and based on a PGS/PGS* mapping, the target unitary is synthesized in the single-qubit gate set. Various single-qubit gate sets such as the Clifford+T gates, the V-gates, and the Fibonacci gates can be used. In some cases, target unitaries are approximated using exactly synthesizable unitaries defined by the final projective gate set that are then mapped into the single-qubit gate set.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections.

As used herein, $\zeta_n$ is an $n^{th}$ root of unity. Sets are generally denoted in boldface text, without italics, and in some cases, as so-called blackboard bold. For example, the set of integers can be noted as $\mathbb{Z}$ or Z. The Pauli gates are represented as $$X = \begin{pmatrix} 0 & 1 \\ 1 & 0 \end{pmatrix}, Y = \begin{pmatrix} 0 & -i \\ i & 0 \end{pmatrix}, Z = \begin{pmatrix} 1 & 0 \\ 0 & -1 \end{pmatrix}$$

and the identity gate is I. In the description of circuit synthesis, gate and gate set descriptions or specifications are sometimes referred to as gates or gate sets for convenience.

Overview

Quantum circuit synthesis requires representation of an arbitrary unitary in a basis set of available gates. For some unitaries, exact syntheses may be unavailable, and approximate syntheses are used. In addition, some quantum circuits are defined as repeat-until-success (RUS) circuits in which a selected computation result is obtained only in some instances. The disclosed methods and apparatus pertain to factoring unitaries using a selected basis (and possibly as RUS designs) and embedding them into a quaternion algebra A. A unitary is rescaled such that a corresponding quaternion q defines an integral and primitive right ideal I of maximal order M of A. The right ideal I is factored into a product of maximal primitive ideals, and products of maximal primitive ideals are combined into principal ideals. The quaternion q can be represented as a product of generators of principal ideals $q_k$ and units $u_k$ as $u_0 q_1 u_1 \ldots q_{m-1} u_{m-1} q_m u_m$. Each $u_k, q_k$ is mapped to a unitary matrix or product of such matrices. If A is definite, the generators of the unit group of M are computed. If A is indefinite, generators can be obtained if A is split at a unique real place so that the unit group is a Fuchsian group. Typically, if the generators of the principal ideals $q_k$ are known to belong to a finite set G, the factorization of unitaries can be found.

The disclosed methods and apparatus are suitable for a variety of gate sets, including gate sets corresponding to SU$(2)_k$, the V-basis, unitaries over rings such as $\mathbb{Z}[\frac{1}{2},\zeta_8,1/p_1,1/p_2]$ or $\mathbb{Z}[\frac{1}{2},\zeta_{16},1/p_1,1/p_2]$, or gate sets such as described in Forest et al., "Exact synthesis of single-qubit unitaries over Clifford-cyclotomic gate sets," arXiv:1501.04944 (January 2015). Note that the Clifford group coincides with matrices over $\mathbb{Z}[\frac{1}{2},\zeta_4]$, ignoring a global phase. The disclosed methods typically involve finding a special description of exactly synthesizable matrices over a single-qubit quantum gate set, or a larger single-qubit quantum gate set that includes an original single-qubit quantum gate set and admits the special description of exactly synthesizable matrices. A correspondence between a projective gate set (PGS) and a single-qubit quantum gate set (GS) is determined. Several heuristics are provided that allow determination of an equivalent projective gate set suitable for a given quantum gate set. These can be based on CM fields that cover a wide class of number fields including cyclotomic number fields. In particular, heuristics for gate sets related to su(2) level k anyons and unitary matrices over the ring $\mathbb{Z}[1/p,\zeta_n]$ for a rational prime p are provided. The correspondences take into account the irrelevance of global phase of unitary matrices in quantum computing applications. Number fields used for particular gate sets can be simplified by dealing with normalization factors in a particular way.

Representative methods determine correspondences between projective gate sets and elements of quaternion algebra. Some particular examples show detailed correspondences of selected quaternion algebras and single-qubit gates. Maximal orders of quaternion algebras related to projective gate sets are determined using several approaches, and sets of ideals corresponding to projective gate sets are established. A set of ideals describing a selected gate set can be found algorithmically given a maximal order and mapping from the gate set to a quaternion algebra. Upon finding a projective gate set defined by a maximal order and a set of ideals, a search method is applied to evaluate whether a new gate set is equivalent to the original gate set or only includes the original gate set as a subset. Exact synthesis methods define an exact decomposition of any unitary matrix using the associated maximal order, ideal, and quaternion algebra, typically based on syntheses over a projective gate set. Given a maximal order, a set of ideals, and correspondences between a single-qubit gate and a projective gate set, and an explicit description of the correspondence based on quaternion algebra and associated gates, a compact description of unitary matrices that can be decomposed using the projective gate set is obtained.

Quaternion Algebra

Quaternion algebras are written as $$B = \left(\frac{a,b}{F}\right)$$

and any element of B can be written as $q=x+y\alpha+z\beta+w\alpha\beta$, $x,y,z,w \in F$. Conjugation is defined as $q^* = x - y\alpha - z\beta - w\alpha\beta$. A reduced trace function trd(q) is defined as $\text{trd}(q) = q + q^* = 2x$. A reduced norm function nrd(q) is defined as $qq^* = x^2 - \alpha y^2 - \beta z^2 + \alpha\beta w^2$. Elements of the form $xI + yiX + ziZ + wiY, x,y,z,w \in F$, wherein I is the identity and X, Y, Z are the Pauli matrices, form a quaternion algebra $$B = \left(\frac{-1,-1}{F}\right).$$

All single qubit unitaries over the Clifford+T gate set are elements of $$B = \left(\frac{-1,-1}{\mathbb{Q}(\zeta_8 + \zeta_8^{-1})}\right).$$

Quaternion algebras and associated operations can be represented with computer-implementable instructions in various ways, and quaternions can be stored as 4-element row or column matrices, or otherwise stored and processed. The methods disclosed herein can be implemented with these or other representations.

Elements of the group SU(2) over $\mathbb{Z}[\frac{1}{2},\zeta_n]$ can be mapped to a quaternion algebra as follows. Any element of $\mathbb{Z}[\zeta_n]$ can be written as $\alpha + \zeta_n b$ for a, b from $\mathbb{Z}(\zeta_n) \cap \mathbb{R}$. Thus, any element of SU(2) over $\mathbb{Z}[\frac{1}{2},\zeta_n]$ can be written as:

$$\begin{pmatrix} (a+b\zeta_n) & -(c+d\zeta_n)^* \\ (c+d\zeta_n) & (a+b\zeta_n)^* \end{pmatrix} = \frac{1}{2^k}\left(aI + b\begin{pmatrix} \zeta_n & 0 \\ 0 & \zeta_n^* \end{pmatrix} - cIY + d\begin{pmatrix} 0 & \zeta_n \\ \zeta_n^* & 0 \end{pmatrix}\right).$$

The identity matrix I can be mapped to 1 and iY can be mapped to element j in the quaternion algebra. Mappings for $$M_1 = \begin{pmatrix} \zeta_n & 0 \\ 0 & \zeta_n^* \end{pmatrix}, M_2 = \begin{pmatrix} 0 & \zeta_n \\ \zeta_n^* & 0 \end{pmatrix}$$

are needed. Two cases are described below in which quaternion q corresponds to unitary U, det(U)=nrd(q).

Case 1: 4|n

In this case, $\sqrt{-1}$ is in $\mathbb{Q}(\zeta_n)$ and any x in $\mathbb{Q}(\zeta_n)$ has real and imaginary parts in $\mathbb{Q}(\zeta_n) \cap \mathbb{R}$. Therefore, using the correspondence $1 \leftrightarrow I, i \leftrightarrow Z, j \leftrightarrow Y, k \leftrightarrow iX$ between quaternions and Pauli matrices, the elements of SU(2) over $\mathbb{Z}[½, \zeta_n]$ can be mapped to elements of quaternion algebra $$\left( \frac{-1, -1}{\mathbb{Q}(\zeta_b) \cap \mathbb{R}} \right).$$

It can be shown that $$M_1 = Re(\zeta_n)I + Im(\zeta_n)iZ, M_2 = iYRe(\zeta_n) + iXIm(\zeta_n).$$

Therefore, $M_1 \leftrightarrow Re(\zeta_n) + i\, Im(\zeta_n), M_2 \leftrightarrow j\, Re(\zeta_n) + k\, Im(\zeta_n)$.

Case 2: 4∤n

In this case, $Im(\zeta_n) = \sin(2\pi/n)$ is not in $\mathbb{Q}(\zeta_n)$ and the mapping $1 \leftrightarrow I, i \leftrightarrow 2iZ \sin(2\pi/n), j \leftrightarrow iY, k \leftrightarrow 2iX \sin(2\pi/n)$ can be used. It can be shown that $$M_1 \leftrightarrow Re(\zeta_n) + i/2, M_2 \leftrightarrow jRe(\zeta_n) + k/2$$

Note that $i^2 = -4 \sin^2(2\pi/k) = 4 \cos^2(2\pi/k) - 4 = (\zeta_n + \zeta_n^{-1})^2 = \zeta_n^2 + \zeta_n^{-2} - 2$. Therefore, the quaternion algebra $$\left( \frac{(2\cos(2\pi k/n))^2 - 4, -1}{\mathbb{Q}(\zeta_n) \cap \mathbb{R}} \right)$$

is used.

Other bases can use these or different quaternion algebras. Fibonacci anyons can be written in the form $$\begin{pmatrix} a + b\zeta_{10} & -((c + d\zeta_{10})\sqrt{\tau})^* \\ (c + d\zeta_{10})\sqrt{\tau} & (a + b\zeta_{10})^* \end{pmatrix}, \tau = \frac{\sqrt{5} - 1}{2},$$

a,b,c,d $\in \mathbb{Z}_{\mathbb{Q}(\zeta_{10})}$. This can be rewritten as $$aI + b\begin{pmatrix} \zeta_{10} & -0^* \\ 0 & \zeta_{10}^* \end{pmatrix} - c(iY\sqrt{\tau}) + d\sqrt{\tau}\begin{pmatrix} 0 & \zeta_{10}^* \\ \zeta_{10} & 0^* \end{pmatrix}.$$

Fibonacci anyons can use the mapping $1 \leftrightarrow I, i \leftrightarrow 2iZ \sin(2\pi k/10), j \leftrightarrow iY\sqrt{\tau}, k \leftrightarrow 2iX \sin(2\pi k/10)\sqrt{\tau}$ which can be associated with the quaternion algebra $$\left( \frac{(2\cos(2\pi/10))^2 - 4, -\tau}{\mathbb{Q}(\zeta_{10}) \cap \mathbb{R}} \right).$$

The Fibonacci matrix representation then can be expressed as $a + b((i+s)/2) - cj + d((js+k)/2), s = Re(\zeta_{10})$. Quaternions 1, (s+j)/2, j, (s*j+k)/2) form a basis of maximal order.

In general, syntheses using $su(2)_k$ anyons can be based on quaternion algebras of the form $$\left( \frac{(2\cos(2\pi/n))^2 - 4, -\mathfrak{z}_q}{\mathbb{Q}^+(\zeta_n)} \right)$$

for n=k+2, wherein $$\mathfrak{z}_q = \frac{q^{3/2} - q^{-3/2}}{q^{1/2} - q^{1/2}},$$

$q = \zeta_n$.

Quaternion-Based Circuit Synthesis

Figure 1:
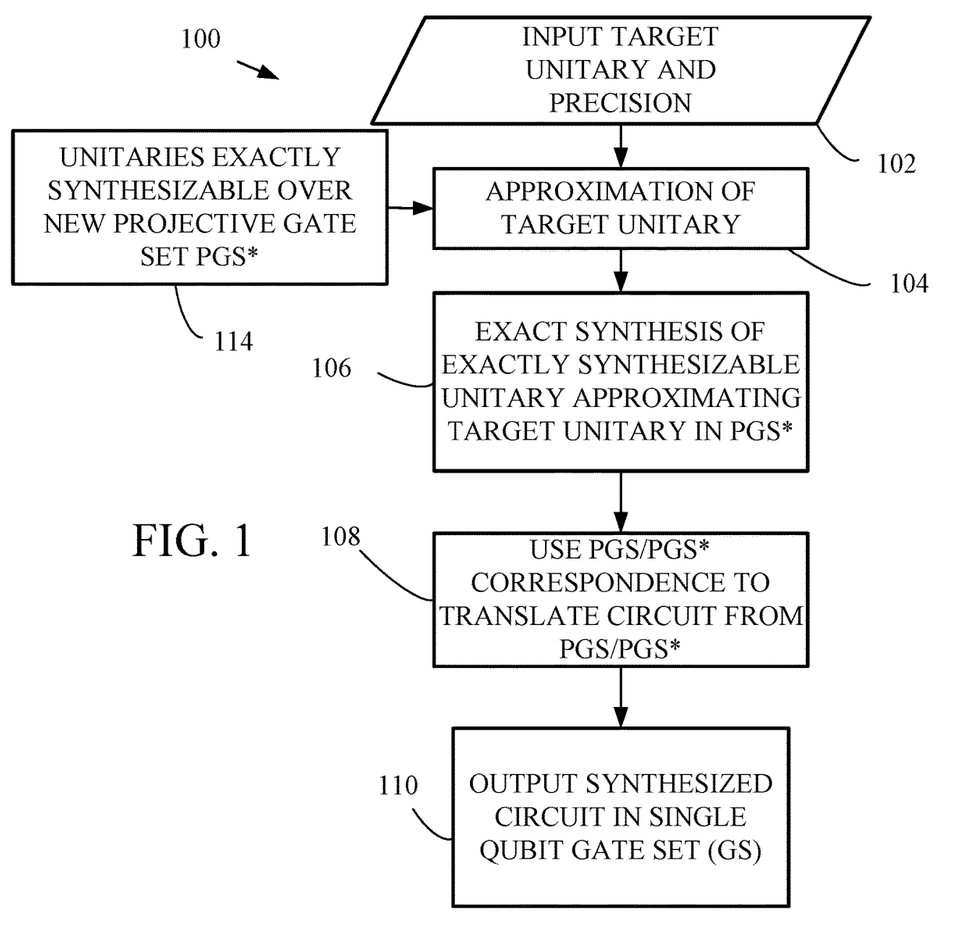
FIG. 1 illustrates method for quantum circuit synthesis using a projective gate set (PGS) corresponding to a single-qubit gate set.

Referring to FIG. 1, a representative quantum circuit synthesis method 100 based on a projective gate set obtained using a quaternion mapping includes receiving an input target unitary and precision at 102. Typically, a selected single-qubit gate set is previously provided, but can be input as well. At 104, the target unitary is approximated, if necessary, based on unitaries exactly synthesizable over a remapped projective gate set PGS*. These unitaries can be previously calculated and stored or computed as needed at 114. An exact synthesis of the approximate target unitary is computed at 106. At 108, correspondence between a PGS and the PGS* is used to translate the circuit from the PGS* to the PGS associated with a single-qubit gate set (GS) and the remapped projective gate set PGS* is determined. In some cases, the original PGS and the remapped PGS* are substantially the same. At 110, a circuit is obtained based on the PGS/PGS* correspondence, so that a circuit is available as a sequence of gates from the gate set GS. The circuit is typically used to defined a series of gates in a quantum computer.

Projective Gate Set Determination

Figure 2:
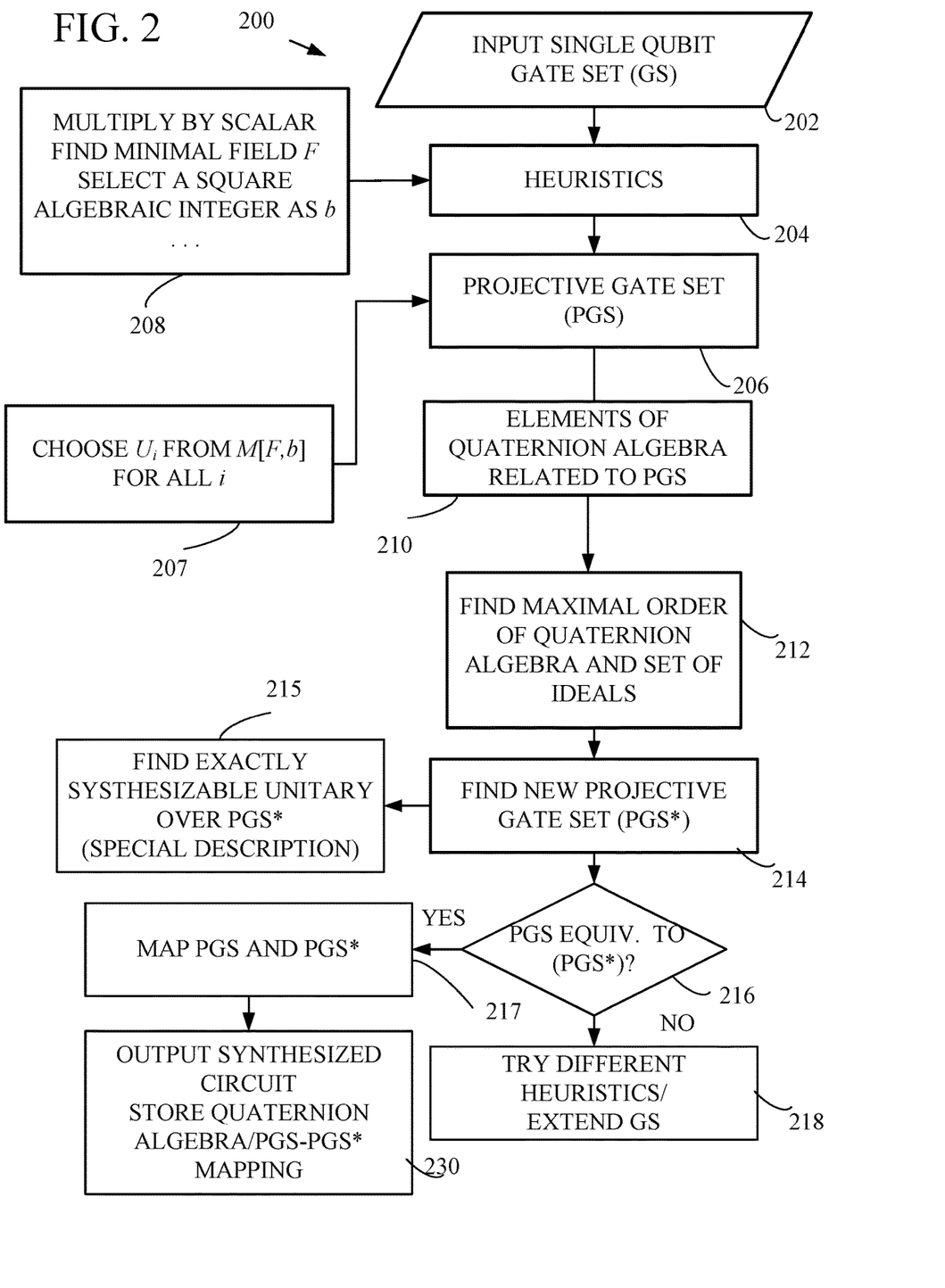
FIG. 2 illustrates a representative method of quantum circuit synthesis based on a quaternion algebra corresponding to a PGS.

Referring to FIG. 2, a method of quantum circuit synthesis 200 using one or more projective gate sets includes receiving a single-qubit gate set (GS) at 202 that can be any arbitrary gate set. At 204, one or more heuristic procedures are applied to GS such as representative procedures 208 that can be performed based on computer-executable instructions stored in one or more computer memory devices. At 206, a projective gate set (PGS) is obtained, typically represented at 207 in a form M[F, b] (discussed in detail below), and at 210, a quaternion algebra corresponding to the PGS is determined. At 212, a maximal order and a set of ideals associated with the quaternion algebra are determined and a new projective gate set PGS* (sometimes referred to as a remapped PGS herein) is computed at 214. Based on PGS*, exactly synthesizable unitaries are determined at 215. At 216, PGS and PGS* are compared. If PGS* is equivalent to PGS, then a mapping between PGS and PGS* is obtained at 217. Otherwise, different heuristics are tried or the initial gate set is extended at 218. A quantum circuit synthesis for a selected target unitary based on the PGS* can be output at 230, or a definition of the quaternion algebra associated with the GS and/or a PGS/PGS* mapping can be stored for future circuit synthesis. Mathematical details of the method 200 are further described below.

Typically, a single-qubit gate set $V_1, \ldots, V_n$ is provided that may or may not be known to be complete. The gates $V_i$ are defined over a particular number field. The gate set $V_1, \ldots, V_n$ can be transformed using various approaches so as to form a projective gate set (PGS) having matrices $U_1, \ldots, U_n$ in the form:

$$M[F, b] = \begin{pmatrix} x & -y^*\sqrt{b} \\ y\sqrt{b} & x^* \end{pmatrix},$$

wherein F is a minimal CM-field over which diagonal entries for each of the gates $V_1, \ldots, V_n$ can be found. Several heuristics can be used. For example, each of the gates $V_i$ can be multiplied by a scalar so that each can be defined over a simpler number field. One convenient example of such a CM-field is a cyclotomic field that is generated by the primitive $n^{th}$ root of unity. If a square root of an element of the real subfield $F^+$ of F corresponds to an off-diagonal entry, this value is selected for b. If there are several possible values of b, a value corresponding to a square free algebraic integer is selected. If a gate $V_j$ has a determinant that is one, rescaling can be done and in many cases such rescaling is sufficient to make the rescaled value an element of M[F,b]. If a gate $U_1, \ldots, U_n$ has a determinant that is not one and is diagonal with a root of unity on the diagonal, then find $U_1, \ldots, U_n$ such that:

$$V_j \rho V_j^* = \frac{U_j \rho U_j^*}{\det U_j},$$

wherein $\rho$ is an arbitrary 2 by 2 Hermitian matrix. For example, for $$V_j = \begin{pmatrix} 1 & 0 \\ 0 & \zeta_n \end{pmatrix}, \zeta_n = e^{2\pi i/n},$$

then $$U_j = \begin{pmatrix} 1+\zeta_n & 0 \\ 0 & 1+\zeta_n^* \end{pmatrix}.$$

If none of these approaches are effective, $V_j$ can be expressed a product of matrices that can be transformed using the above approaches.

Some representative mappings of a set GS to a PGS are shown in Table 1 below.

TABLE 1

Single-qubit gate sets mapped to projective gate sets

| GS | F, b | Gates | PGS |
|---|---|---|---|
| V-basis | F = Q[i], b = 1 | $V_z = \frac{1}{\sqrt{5}}\begin{pmatrix} 1+2i & 0 \\ 0 & 1-2i \end{pmatrix}$ | $U_z = \begin{pmatrix} 1+2i & 0 \\ 0 & 1-2i \end{pmatrix}$ |
| Clifford+T | F = Q[$\zeta_8$], b = 1 | $V_j = \begin{pmatrix} 1 & 0 \\ 0 & \zeta_n \end{pmatrix}$ | $U_j = \begin{pmatrix} 1+\zeta_8 & 0 \\ 0 & 1+\zeta_8^* \end{pmatrix}$ |
| Fibonacci | F = Q[$\zeta_{10}$], b = $\tau$ | $V_j = \begin{pmatrix} \tau & -\sqrt{\tau} \\ \sqrt{\tau} & \tau \end{pmatrix}$, $\tau = \frac{\sqrt{5}-1}{2}$ | $U_j = \begin{pmatrix} \tau & -\sqrt{\tau} \\ \sqrt{\tau} & \tau \end{pmatrix}$ |
| SU(2) level k anyons | F = Q[q], $b = \frac{-(q^{3/2}-q^{-3/2})}{(q^{1/2}-q^{-1/2})}$, q = $\zeta_{k+2}$ | | |
| Matrices over Z[$\zeta_n$, $1\sqrt{p_1}, \ldots 1\sqrt{p_m}$], $p_k$ a rational prime. | F = Q[$\zeta_n$], b = 1 | | |

After determining a PGS based on the initial GS, a set of elements of a quaternion algebra is obtained that correspond to the PGS. A value D is found that is a totally positive algebraic integer in $F^+$ such that $F = F^+[\sqrt{-D}]$, and a quaternion algebra $$A = \left(\frac{-D, -b}{F^+}\right)$$

having a basis 1, i, j, k is selected for use. For example, if $F = Q[\zeta_c]$, then $F^+ = Q[\zeta_n + \zeta_n^{-1}]$. If 4|n, then $F = F^+[\sqrt{-1}]$ and $D = -1$. Otherwise, $D = (\zeta_n + \zeta_n^{-1})^2 - 4$. A mapping $$\mu: M[F, b] \to \left(\frac{-D, -b}{F^+}\right)$$

is then found, comprising $\mu(I)=1, \mu(\sqrt{-D}Z)=i, \mu(\sqrt{-b}X)=j, q_k = \mu(U_k)$, wherein X, Z are Pauli matrices. In other examples, different Pauli matrices or combinations of Pauli matrices can be used.

With the mapping $\mu$, an order O is then constructed that contains all $q_k$, and a maximal order containing O is constructed. Alternatively, a maximal finite subgroup of a group generated by a set of some $q_k$, is found. An order O can then be constructed based on generators of the group. In another alternative, if quaternion basis elements i, j, k can be expressed using $q_k$, then the order $Z_F \oplus Z_F i \oplus Z_F j \oplus Z_F k$ is used, and an associated maximal order is found. The maximal order is then checked to determine that it contains all $q_k$. If not, the $q_k$, can be rescaled. In yet another example, if the quaternion algebra is described as $$\left(\frac{-1,-1}{F^+}\right)$$

such that 2 is equal to $\zeta^2$ up to a unit of $F^+$, wherein $\zeta$ is an algebraic integer in $F^+$ then the maximal order $$Z_F \oplus \frac{\zeta Z_F}{2}(i+1) \oplus \frac{\zeta Z_F}{2}(j+1) \oplus \frac{Z_F}{2}(1+i+j+k)$$

may be suitable.

With the maximal order determined, a set of ideals related to the set of elements of the quaternion algebra A is found. As noted above, the maximal order contains all of the $q_k$. The set of ideals is given by S={p|$q_k q_k^* Z_F \subset$ p}, wherein p is a prime ideal in $Z_F$, and can be built by prime factorization of ideals $q_k q_k^* Z_F$. Sets of ideals for representative bases are summarized in Table 2.

TABLE 2

Ideals for representative bases

| Basis | F, b, F$^+$ | S |
|---|---|---|
| V basis | F = Q[i], b = 1, F$^+$ = Q | S = ⟨ 5Z⟩ |
| Clifford + T basis | F = Q[$\zeta_8$], b = 1, F$^+$ = Q [√2] | S = ⟨ |1 + $\zeta_8$|$^2$ Z [√2]⟩ |
| Fibonacci basis | F = Q[$\zeta_{10}$], b = τ, F$^+$ = Q [τ] | S = ⟨Z|τ|⟩ |

Non-unit generators Q corresponding to the maximal order M and the set of ideals S can be found along with unit generators U corresponding to M. The unit generators and the maximal order M are then mapped to a new PGS referred to as PGS*. In some cases, this procedure is unsuccessful, either due to computational difficulties or a deficiency in the original gate set. In other cases, PGS* does not correspond precisely to the original gate set but includes some added operations that extend the original gate set. Even if a gate set is known to be universal, an efficient procedure for using the gate set to represent an arbitrary unitary is not necessarily available.

Figure 3:
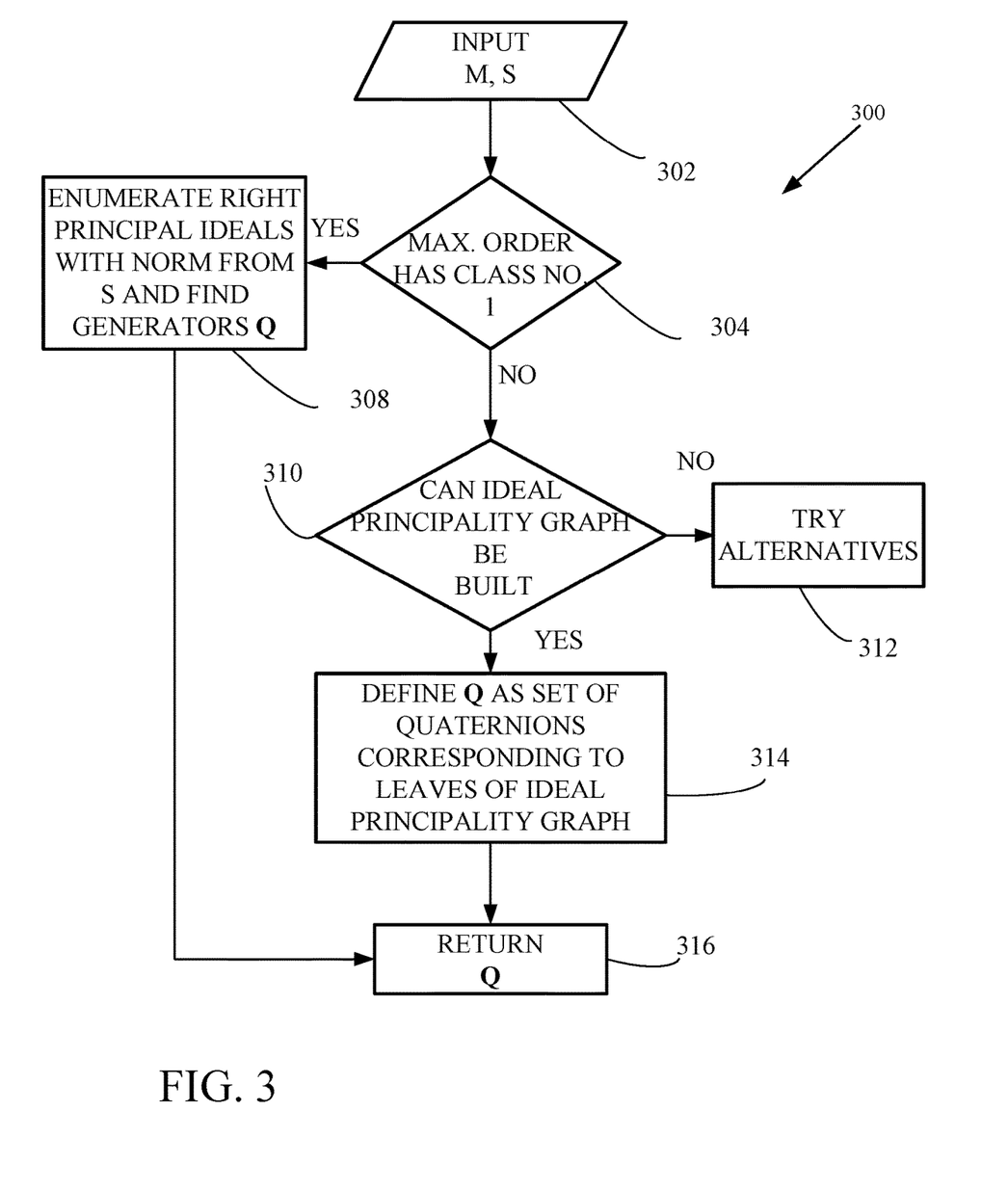
FIG. 3 illustrates a representative method of determining a set of quaternions based on a maximal order and an associated set of ideals.

Referring to FIG. 3, a method 300 includes receiving the maximal order M and the set of ideals S at 302. At 304, if the maximal order M has class number 1, then the set of unit generators Q is determined by enumerating right principal ideals with norm from S and finding their generators at 306. If the maximal order M does not have class number 1, then at 310, a determination is made as to whether an ideal principality graph can be made. If not, at 312, additional choices in earlier steps can be tried. Otherwise, the ideal principality graph can be made, and Q is defined as a set of quaternions corresponding to leaves of the ideal principality graph at 314. At 316, Q is returned, if available.

Figure 4:
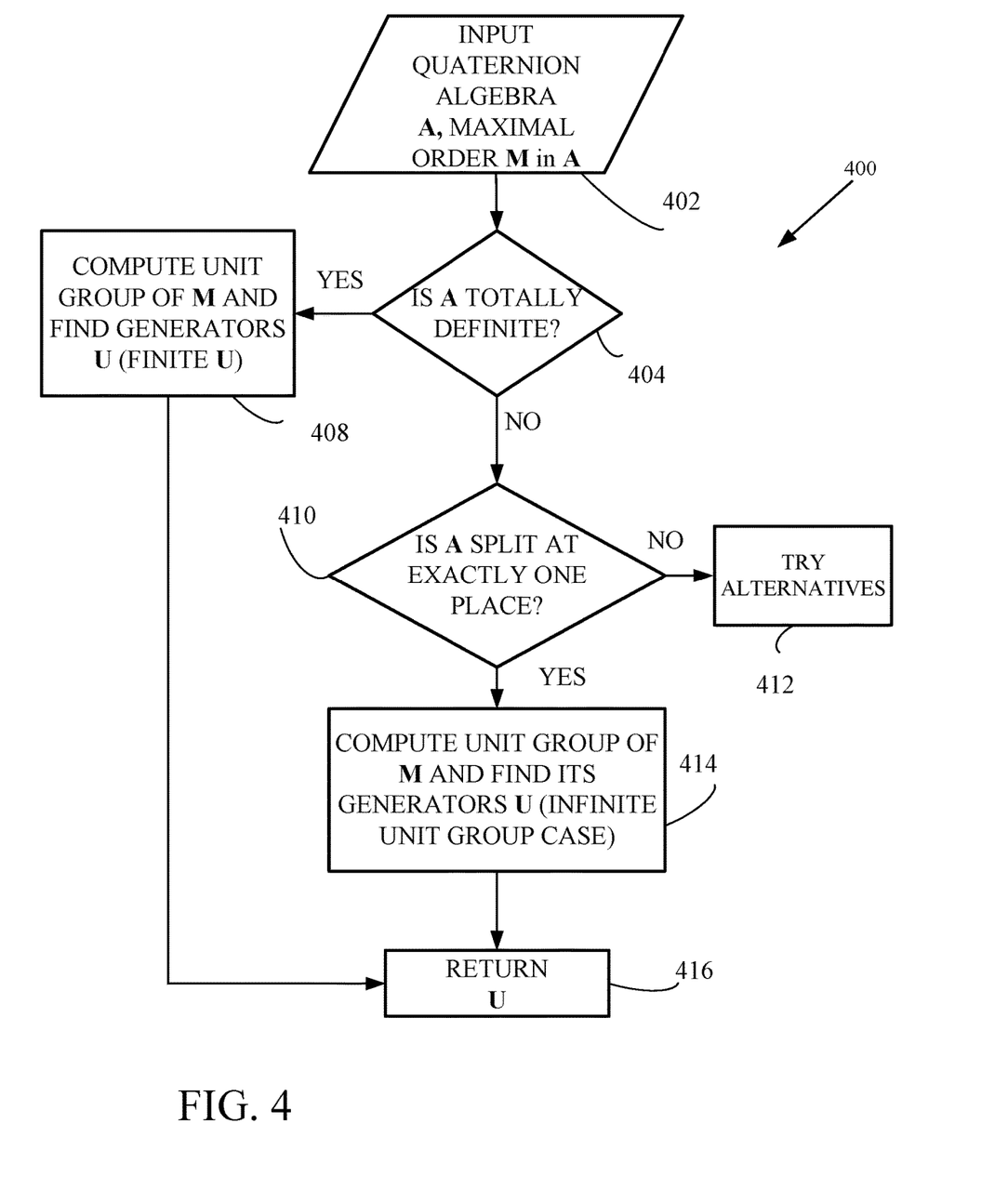
FIG. 4 illustrates a representative method of determining a set of generators U based on a quaternion algebra corresponding to a PGS.

Referring to FIG. 4, a method 400 of determining unit generators U associated with M includes obtaining a specification of a quaternion algebra at 402. At 404, it is determined if the quaternion algebra is totally definite. If so, a unit group of the quaternion algebra is computed and generators U (finite) are determined at 408. If not, at 410, it is determined if the quaternion algebra is split at exactly one place at infinity. If not, alternative procedures can be evaluated at 412. If so, a unit group of the quaternion algebra is computed and generators U are determined at 414. If available, the unit generators U are returned at 416.

Figure 5:
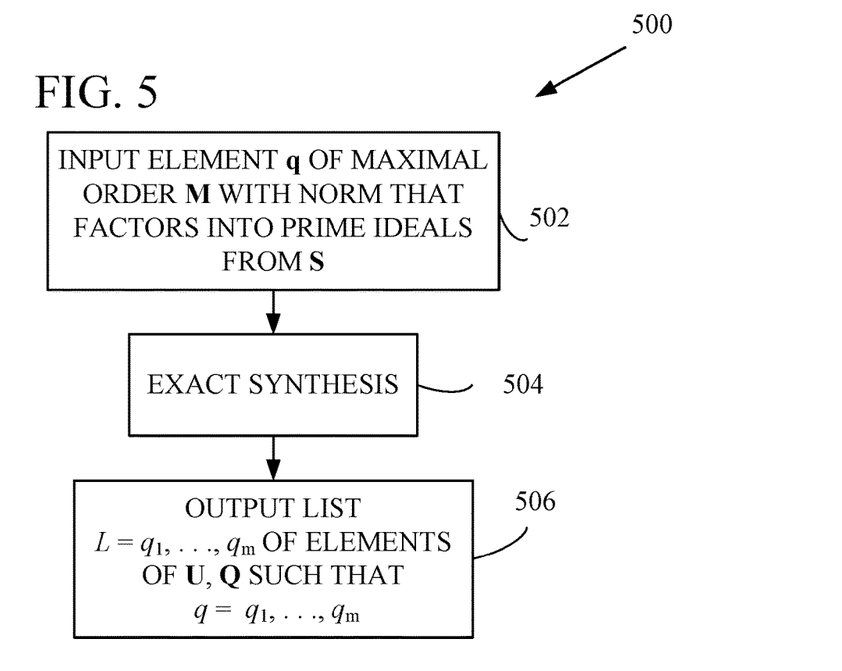
FIGS. 5-6 illustrate representative methods of exact synthesis using projective gate sets and associated quaternion characteristics.

With reference to FIG. 5, a method 500 of exact synthesis includes receiving an element q of the maximal order M having a norm that factors into prime ideals from the set of ideals Sat 502. At 504, an exact synthesis procedure is performed (shown below in Table 3), and at 506 a list of elements of U, Q are output such that q=$q_1$ . . . $q_m$.

TABLE 3

Pseudo-code for exact synthesis using M and Q

Figure 6:
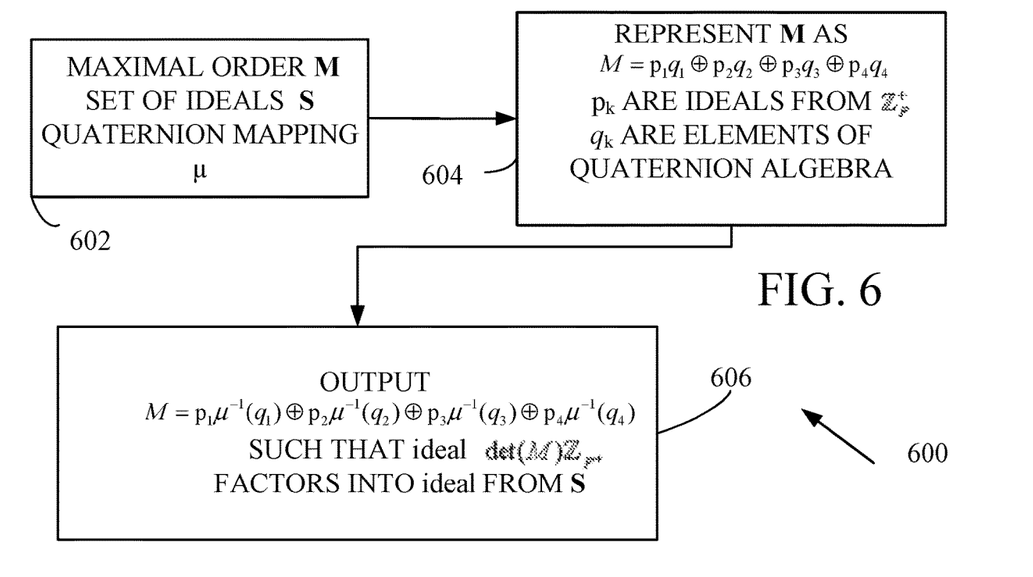

L ← empty list
while q is not a unit of M
  Find g from Q such that:
    1) g$^{-1}$ q is in M
    2) ideal nrd(g$^{-1}$ q)Z $_{F+}$ has less prime factors
       then ideal nrd(q)Z $_{F+}$
  Append g to the end of L
  q ← g$^{-1}$ q
end while
Decompose q in terms of generators of unit group of M **
and get list $u_1,...,u_s$ such that q = $u_1..u_s$
Append $u_1,...,u_s$ to the end of list L A method 600 for obtaining a description of exact unitaries is illustrated schematically in FIG. 6. A maximal order M, a set of ideals, and a quaternion mapping μ described above are received at 602, and M is represented as M=$p_1 q_1 \oplus p_2 q_2 \oplus p_3 q_3 \oplus p_4 q_4$. At 606, matrices M are output from the set defined by $$M = p_1 \mu^{-1}(q_1) \oplus p_2 \mu^{-1}(q_2) \oplus p_3 \mu^{-1}(q_3) \oplus p_4 \mu^{-1}(q_4)$$

As discussed above, for G chosen to be a subset of $\mathcal{M}_S$ (all elements s of $\mathcal{M}$ such that nrd(s) factors into elements of S), G ⊂ $\mathcal{M}$ can be found. However, it can be further shown that any element of $\mathcal{M}_S$ can be written as a product $q_1 \ldots q_n u\alpha$ wherein quaternions $q_1, \ldots, q_n$ are from a finite set ext$_S$($\mathcal{M}$) and u is an element of a unit group of maximal order $\mathcal{M}$, and α is an element of F. If one of the following conditions holds u can be written as a product of finite number elements of gen$_u$($\mathcal{M}$): (1) F is a totally real number field, and $$\left(\frac{a,b}{F}\right)$$

is a totally definite quaternion algebra, or (2) F is a totally real number field, and $$\left(\frac{a,b}{F}\right)$$

is split in exactly one real place. It will be appreciated that several methods for determining $\text{ext}_S(\mathcal{M})$ $\text{gen}_u(\mathcal{M})$, and $q_1 \ldots q_n u\alpha$ are known and can be selected for such determinations.

Thus, a finite set of quaternions G can be found such that any element of $\mathcal{M}_S$ can be written as $q_1 \ldots q_n$ for $q_k$ elements of G. A method for such factorization of elements of $\mathcal{M}_S$ into a finite set of quaternions is illustrated in the pseudo-code of Table 4. Additional procedures used include procedures for finding generators of a maximal order, testing membership in a maximal order, computing the discriminant of a quaternion algebra, returning a sequence length (procedure LENGTH), finding a number of ideals in a set S that does not divide the discriminant (procedure TOT-IDEALS), determining valuation $vS(x) = \Sigma_{p \in S} v_p(x\mathbb{Z}_F)$, wherein $v_p$ is a p-adic valuation of the ideal xF of number field F, procedure IS-TSI-CLASS-GROUP-TRIVIAL returns true if the two sided ideal class group of $$\left(\frac{a,b}{F}\right)$$

is trivial, procedures for computing the generators of prime ideals with norm that divides discriminant of $$\left(\frac{a,b}{F}\right),$$

procedure IDEAL-GENERATOR which determines a generator of right principal $\mathcal{M}$ ideal, procedures for conjugation of maximal orders by an element, multiplication of ideals and maximal orders, ideals inversion, and conjugation of ideals by quaternion, and procedure UNIT-DECOMPOSE which decomposes a unit of maximal order $\mathcal{M}$ into a product of generators of the unit group of $\mathcal{M}$ when $$\left(\frac{a,b}{F}\right)$$

is either totally definite or $$\left(\frac{a,b}{F}\right)$$

splits in exactly one place. In addition, MAX-ORDER, PARENT-ID, IDEAL-ID are defined as MAXORDER($s_1,s_2,s_3,q$)=($s_3,q$),PARENT-ID($s_1,s_2,s_3,q$)=$s_2$,IDEAL-ID($s_1,s_2,s_3$,=$s_1$, respectively, wherein $S_1$, $S_2$, $S_3$ are integers, and q is from $$\left(\frac{a,b}{F}\right).$$

Pseudo-code for some of these procedures is listed in Tables 5-8 and others can be implemented with conventional computational algebra systems.

TABLE 4

Factorization of elements of $\mathcal{M}_S$ into a finite set of quaternions

Input: Maximal order $\mathcal{M}$ of $\left(\frac{a,b}{F}\right)$, set S of prime ideals of $\mathbb{Z}_F$, an element q of
$\mathcal{M}$ such that nrd(q) $\mathbb{Z}_F$ factors into ideals from S (assumes that two side ideal class group of $\left(\frac{a,b}{F}\right)$ is trivial)
1: procedure EXACT-SYNTHESIS-2($\mathcal{M}$, S, q)
2:   (C, q) ← EXACT-SYNTHESIS-STAGE-1($\mathcal{M}$, S, q)
3:   Add TWO-SIDED-DECOMPOSE(q, $\mathcal{M}$, S) to the end of C
4:   return C
5: end procedure
Output: Outputs $q_1 \ldots q_m u_1 \ldots u_n$ = q where $q_i$ are from $\text{ext}_S(\mathcal{M})$
  and $u_j$ are generators of the unit group of $\mathcal{M}$

TABLE 5

Additional procedures for the method shown in Table 4.

Input: Maximal order $\mathcal{M}$ of $\left(\frac{a,b}{F}\right)$, set S of prime ideals of $\mathbb{Z}_F$
1: procedure FIND-S-GENERATORS($\mathcal{M}$, S)
2:   M ← SPANNING-TREE-SIZE($\mathcal{M}$, S)
3:   if M = ∞ then
4:     return ∅
5:   else
6:     Adj ← MAX-ORDERS-ADJ($\mathcal{M}$, S)
7:     ($s_0$, $q_0$) ← CONJ-CLASS-DESCR($\mathcal{M}$)
8:     V ← sequence of levels of $T_S(\mathcal{M})$ of size M, each level
       is empty
9:     $V_0$ ← (0, 0, $s_0$, $q_0$)   ▷ Sequence of length one
10:    $V_1$ ← S-NEIGHBOURS(Adj, 1, $V_0$[1])
11:    for all k = 2, . . . , M do
12:      $V_k$ ← NEW-LEVEL(Adj, $s_0$, $V_{k-1}$, $V_{k-2}$)
13:    end for
14:    return {q : ($s_0$, q) = MAX-ORDER(v), v ∈ $V_k$, k = 1, . . . , M}
15:  end if
16: end procedure
Output: Set of canonical generators $\text{gen}_S(\mathcal{M})$ if $G_S(\mathcal{M})$ finite
  and ∅ otherwise
Input: Maximal orders adjacency description Adj, $s_0$ - conjugacy class
  of $\mathcal{M}$, vertices description of the current layer $V_c$
  of the previous layer $V_{pr}$.
17: procedure NEW-LEVEL(Adj, $s_0$, $V_c$, $V_{pr}$)
18:   $V_{new}$ ← empty sequence of vertex descriptions
19:   for all m = 1, . . . , LENGTH($V_c$) do
20:     N ← S-NEIGHBOURS(Adj, m, $V_c$[m])
21:     O ← MAX-ORDER($V_{pr}$[PARENT-ID($V_c$[m])])
22:     for all v' ∈ N do
23:       if IDEAL-ID(v) = IDEAL-ID(v') then
24:         if IS-EQUAL(O, MAX-ORDER(v')) then
25:           Append v' to $V_{new}$
26:         end if
27:       else
28:         Append v' to $V_{new}$
29:       end if
30:     end for
31:   end for
32:   return $V_{new}$
33: end procedure

TABLE 6

Additional procedures for the method shown in Table 4.

Input: Maximal orders adjacency description Adj,
          index of the vertex description in its level m,
          vertex description v
1: procedure S-NEIGHBOURS(Adj,m,v)
2:    (s,q) ← MAX-ORDER(v)
3:    N ← empty sequence of vertex descriptions
4:    for all k = IDEAL-ID(v),...,TOTAL-IDEALS do
5:       Append v ∈ {(k,m,s',qq'):(s',q') ∈ $Adj_{s,k}$} to N
6:    end for
7:    return N
8: end procedure
Output: Vertex descriptions of S-veighbours of v
Input: $s_i,q_i$ defining a maximal order $q_i \mathcal{M}_{s_i} q_i^{-1}$
       $\mathcal{M}_{s_i}$ is the maximal order with index $s_i$
       in the sequence output by CONJ-CLASSES-LIST
9: procedure IS-EQUAL($(s_1,q_1),(s_2,q_2)$))
10:   if $s_1 = s_2$ then
11:     $\mathcal{M}_1,...,\mathcal{M}_l$ ← CONJ-CLASSES-LIST
12:     Let $g_1,...,g_m$ be generators of $\mathcal{M}_{si}$
13:     q ← $q_1^{-1} q_2$
14:     return TRUE if all $qg_k q^{-1}$ are from $\mathcal{M}_{s_1}$, FALSE otherwise
15:   else
16:     return FALSE
17:   end if
18: end procedure
Output: TRUE if maximal orders are equal and FALSE otherwise

TABLE 7

Additional procedures for the method shown in Table 4.

Input: Maximal order $\mathcal{M}$ of $\left(\frac{a,b}{F}\right)$, set S of prime ideals of $\mathbf{Z}_F$
    procedure SPANNING-TREE-SIZE($\mathcal{M}$, S)
       $Adj_{1,1},...,Adj_{m,l}$ ← MAX-ORDERS-ADJ(S)
       $(s_0, q_0)$ ← CONJ-CLASS-DESCR($\mathcal{M}$)
       $E_1$ ← {$(s_0, j, i)$ : $(j, q) \in Adj_{s_0,i}$, $i = 1,...,l$, $j \neq s_0$}
       k ← 1
       while $E_k$ is not empty do
          for all $(s, j, i) \in E_k$ do
             if #{$(s, q)$ : $(s, q) \in Adj_{j,i}$, $s \neq s_0$} > 0 then
                $E_{k+1}$ ← $E_{k+1} \cup \{(j, s, i)\}$
             end if
             for all $i' = i + 1, ..., l$ do
                $E_{k+1}$ ← $E_{k+1} \cup \{(j, s', i') : (s', q) \in Adj_{j,i'}, s' \neq s_0\}$
             end for
          end for
          if $E_{k+1}$ is equal to one of $E_1, ..., E_k$ then
             return ∞
          else
             k ← k + 1
          end if
       end while
       return k
    end procedure
Output: Depth of the $T_S(\mathcal{M})$ if its finite and ∞ otherwise

TABLE 8

Additional procedures for the method shown in Table 4.

Input: Maximal order $\mathcal{M}$ of $\left(\frac{a,b}{F}\right)$, set S of prime ideals of $\mathbf{Z}_F$, an element q of
$\mathcal{M}$ such that nrd(q) $\mathbf{Z}_F$ factors into ideals from S
(assumes that two side ideal class group of $\left(\frac{a,b}{F}\right)$ is trivial)

1: procedure EXACT-SYNTHESIS-1($\mathcal{M}$, S, q)
2:   $gen_S(\mathcal{M})$ ← FIND-S-GENERATORS($\mathcal{M}$, S)   ▷ Precomputed
3:   G ← {PRIMITIVE-REPR($\mathcal{M}$, x) : x ∈ $gen_S(\mathcal{M})$}   ▷ Precomputed
4:   Let $S_0 = \{p_1, ..., p_t\}$ be all elements of S that does not divide the discriminant of $\left(\frac{a,b}{F}\right)$ 5:   q ← PRIMITIVE-REPR($\mathcal{M}$, q)
6:   C ← empty sequence of quaternions
7:   while $v_{S_0}$(nrd(q)) > 0 do
8:     Find $q_{min}$ from G such that $q_{min}^{-1}q$ is in $\mathcal{M}$
     and $v_{S_0}$(nrd($q_{min}^{-1}q$)) minimal possible
9:     Add $q_{min}$ to the end of C, q ← $q_{min}^{-1}q$
10:   end while
11:   Add TWO-SIDED-DECOMPOSE(q, $\mathcal{M}$, S) to the end of C
12:   return C
13: end procedure
Output: Outputs $q_1, ..., q_m, u_1, ..., u_n$ such that there product is q, where $q_i$ are from $gen_S^{pr}(\mathcal{M})$ and $u_j$ are generators of the unit group $\mathcal{M}$
14: procedure TWO-SIDED-DECOMPOSE(q, $\mathcal{M}$, S)

(assumes that two side ideal class group of $\left(\frac{a,b}{F}\right)$ is trivial)

TABLE 8-continued

Additional procedures for the method shown in Table 4.

15: $Q_1, \ldots, Q_M$ - generators of prime ideals with the norm that divides discriminant of $\left(\dfrac{a, b}{F}\right)$ and from S
16: C ← empty sequence of quaternions
17: Find α from F such that αq is integral and nrd(αq) does not divide the discriminant of $\left(\dfrac{a, b}{F}\right)$, q ← αq
18: while $v_S(nrd(q)) > 0$ do
19:   Find $q_{min}$ from $Q_1, \ldots, Q_M$ such that $q_{min}^{-1}q$ is in $\mathcal{M}$
20:   Add $q_{min}$ to the end of C, q ← $q_{min}^{-1}q$
21: end while
22: Add UNIT-DECOMPOSE(q) to the end of C
23: return C, α
24: end procedure Input: Maximal order $\mathcal{M}$ of $\left(\dfrac{a, b}{F}\right)$, an element q of $\mathcal{M}$ (assumes that two side ideal class group of $\left(\dfrac{a, b}{F}\right)$ is trivial)

25: procedure PRIMITIVE-REPR($\mathcal{M}$, q)
26:   I ← $(q\mathcal{M}q^{-1})\mathcal{M}$
27:   $I_{pr}$ ← PRIMITIVE-IDEAL(I)
28:   return IDEAL-GENERATOR(I)
29: end procedure

Representative Computing Environments

Figure 7:
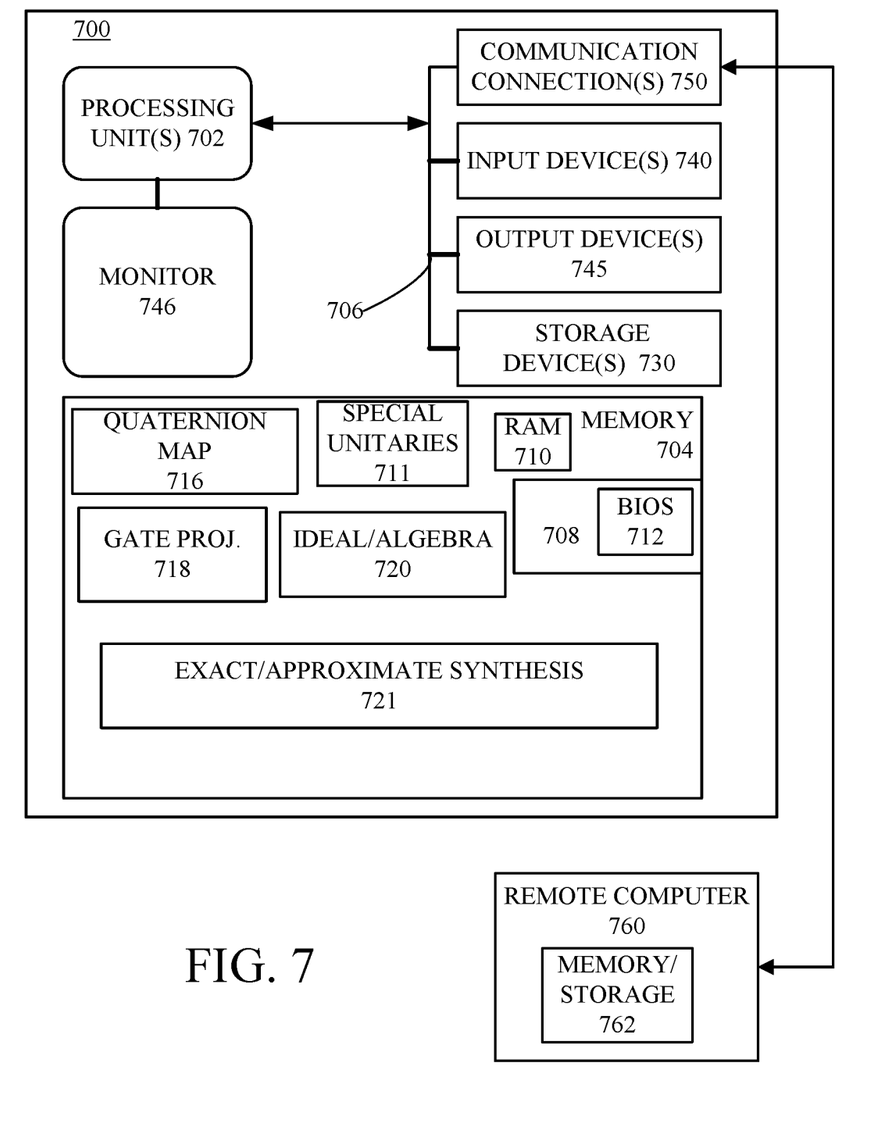
FIG. 7 illustrates a representative classical computing environment for implementation of the disclosed methods for determination of projective gate sets, ideals, maximal orders, special unitaries, quaternion algebras, and other related methods, including exact and approximate circuit synthesis.

FIG. 7 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, an exemplary system for implementing the disclosed technology includes a general purpose computing device in the form of an exemplary conventional PC 700, including one or more processing units 702, a system memory 704, and a system bus 706 that couples various system components including the system memory 704 to the one or more processing units 702. The system bus 706 may be any of several types of bus structures including a memory bus or memory controller, a peripheral bus, and a local bus using any of a variety of bus architectures. The exemplary system memory 704 includes read only memory (ROM) 508 and random access memory (RAM) 710. A basic input/output system (BIOS) 712, containing the basic routines that help with the transfer of information between elements within the PC 700, is stored in ROM 708. As shown in FIG. 7, the system memory 704 stores computer-executable instructions for quaternion mapping, defining special unitaries, finding projective gate sets, algebraic computations, and exact/approximate circuit synthesis in memory portions 716, 711, 718, 720, 721, respectively.

The exemplary PC 700 further includes one or more storage devices 730 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 706 by a hard disk drive interface, a magnetic disk drive interface, and an optical drive interface, respectively. The drives and their associated computer readable media provide nonvolatile storage of computer-readable instructions, data structures, program modules, and other data for the PC 700. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 730 including an operating system, one or more application programs, other program modules, and program data. Storage of quantum syntheses and instructions for obtaining such syntheses can be stored in the storage devices 730. A user may enter commands and information into the PC 700 through one or more input devices 740 such as a keyboard and a pointing device such as a mouse. Other input devices may include a digital camera, microphone, joystick, game pad, satellite dish, scanner, or the like. These and other input devices are often connected to the one or more processing units 702 through a serial port interface that is coupled to the system bus 706, but may be connected by other interfaces such as a parallel port, game port, or universal serial bus (USB). A monitor 746 or other type of display device is also connected to the system bus 706 via an interface, such as a video adapter. Other peripheral output devices, such as speakers and printers (not shown), may be included. In some cases, a user interface is display so that a user can input a circuit for synthesis, and verify successful synthesis.

The PC 700 may operate in a networked environment using logical connections to one or more remote computers, such as a remote computer 760. In some examples, one or more network or communication connections 750 are included. The remote computer 760 may be another PC, a server, a router, a network PC, or a peer device or other common network node, and typically includes many or all of the elements described above relative to the PC 700, although only a memory storage device 762 has been illustrated in FIG. 7.

The personal computer 700 and/or the remote computer 760 can be connected to a logical a local area network (LAN) and a wide area network (WAN). Such networking environments are commonplace in offices, enterprise wide computer networks, intranets, and the Internet.

When used in a LAN networking environment, the PC 700 is connected to the LAN through a network interface. When used in a WAN networking environment, the PC 700 typically includes a modem or other means for establishing communications over the WAN, such as the Internet. In a networked environment, program modules depicted relative to the personal computer 700, or portions thereof, may be stored in the remote memory storage device or other locations on the LAN or WAN. The network connections shown are exemplary, and other means of establishing a communications link between the computers may be used.

Figure 8:
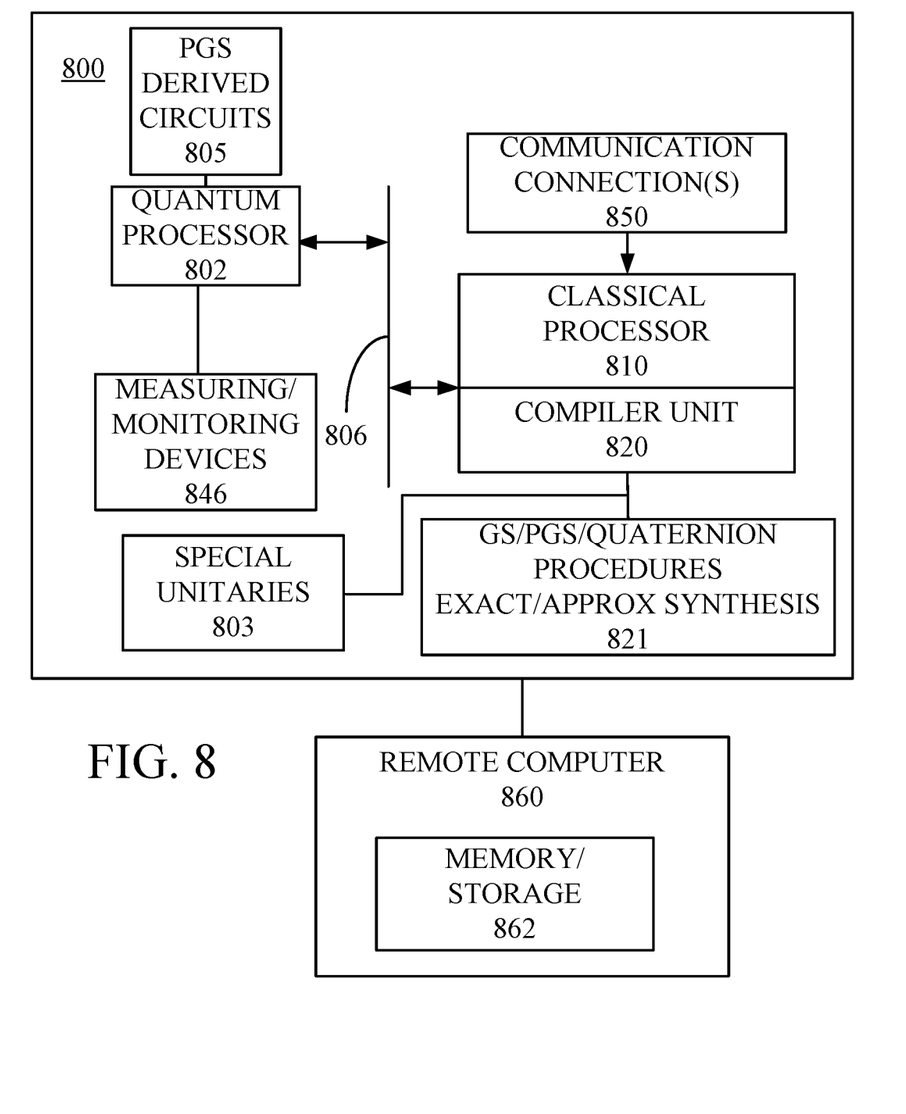
FIG. 8 illustrates a representative quantum and classical computing environment for implementation of the disclosed methods, including a compiler for establishing quantum circuits based on series of gates determined using projective gate sets, ideals, maximal orders, special unitaries, and quaternion algebras, and a quantum computer that implements circuits synthesized by the compiler.

With reference to FIG. 8, an exemplary system for implementing the disclosed technology includes computing environment 800, where compilation into PES derived quantum circuits is separated from the quantum processing that consumes the compiled circuits. The environment includes a quantum processing unit 802 and one or more monitoring/measuring device(s) 846. The quantum processor executes quantum circuits that are precompiled by classical compiler unit 820 utilizing one or more classical processor(s) 810. The precompiled quantum circuits are downloaded into the quantum processing unit via quantum bus 806. Synthesis procedures associated with quaternion algebras and projective gates are stored in a memory 821, and special unitaries or procedures associated with such unitaries are stored in a memory 803.

With reference to FIG. 8, the compilation is the process of translation of a high-level description of a quantum algorithm into a sequence of quantum circuits. Such high-level description may be stored, as the case may be, on one or more external computer(s) 860 outside the computing environment 800 utilizing one or more memory and/or storage device(s) 862, then downloaded as necessary into the computing environment 800 via one or more communication connection(s) 850. Gate sets (circuits) 805 defined using projective gate sets and quaternion algebra based synthesis are coupled to the quantum processor 802.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

The invention claimed is:

1. A quantum circuit synthesis method implemented on a classical processor, comprising:
with the classical processor, selecting a single-qubit gate set; and
with the classical processor, processing the single-qubit gate set and determining a projective gate set corresponding to the single-qubit gate set, wherein the projective gate includes gates representable in a form $$\begin{pmatrix} x & -y^*\sqrt{b} \\ y\sqrt{b} & x^* \end{pmatrix},$$

wherein x and y are complex numbers and b is a real number and x, y, and b specify the gates of the projective gate set.

2. The quantum circuit synthesis method of claim 1, further comprising determining a mapping of the projective gate set to a quaternion algebra.

3. The quantum circuit synthesis method of claim 2, wherein determining the mapping comprises establishing elements of the quaternion algebra.

4. The quantum circuit synthesis method of claim 2, wherein the mapping is associated with a selected nth root of unity.

5. The quantum circuit synthesis method of claim 4, wherein the mapping is associated with an $8^{th}$ or $10^{th}$ root of unity.

6. The quantum circuit synthesis method of claim 2, wherein the elements of the quaternion algebra are established based on at least one Pauli matrix.

7. The quantum circuit synthesis method of claim 2, wherein the elements of the quaternion algebra are established so that a first element corresponds to an identity matrix and a second element is associated with at least one of a Pauli X, Y, or Z matrix.

8. The quantum circuit synthesis method of claim 2, further comprising determining a maximal order associated with the quaternion algebra that includes elements corresponding to the single-qubit gate set.

9. The quantum circuit synthesis method of claim 8, further comprising determining a set of ideals corresponding to the single-qubit gate set.

10. The quantum circuit synthesis method of claim 2, wherein the single-qubit gate set is associated with the Clifford+T basis or the V-basis.

11. A quantum circuit synthesizer, comprising:
a processor; and
at least one memory coupled to the processor and having stored thereon processor-executable instructions for a method that includes:
with the processor, selecting a single-qubit gate set, and
with the processor, processing the single-qubit gate set and determining a projective gate set corresponding to the single-qubit gate set, wherein the projective gate set includes gates representable in a form $$\begin{pmatrix} x & -y^*\sqrt{b} \\ y\sqrt{b} & x^* \end{pmatrix},$$

wherein x and y are complex numbers and b is a real number and x, y, and b specify the gates of the projective gate set.

12. The quantum circuit synthesizer of claim 11, wherein the method further comprises determining a mapping of the projective gate set to a quaternion algebra.

13. The quantum circuit synthesizer of claim 11, wherein determining the mapping comprises establishing elements of the quaternion algebra.

14. The quantum circuit synthesizer of claim 11, wherein the mapping is associated with a selected nth root of unity.

15. The quantum circuit synthesizer of claim 11, wherein the mapping is associated with an $8^{th}$ or $10^{th}$ root of unity.

16. The quantum circuit synthesizer of claim 11, wherein the elements of the quaternion algebra are established based on at least one Pauli matrix or wherein the elements of the quaternion algebra are established so that a first element corresponds to an identity matrix and a second element is associated with at least one of a Pauli X, Y, or Z matrix.

17. The quantum circuit synthesizer of claim 11, wherein the method further comprises determining a maximal order associated with the quaternion algebra that includes elements corresponding to the single-qubit gate set.

18. The quantum circuit synthesizer of claim 11, wherein the method further comprises determining a set of ideals corresponding to the single-qubit gate set.

19. The quantum circuit synthesizer of claim 11, wherein the single-qubit gate set is associated with the Clifford+T basis or the V-basis.

* * * * *